(12) United States Patent
Fu et al.

(10) Patent No.: US 11,777,797 B2
(45) Date of Patent: Oct. 3, 2023

(54) METHOD AND APPARATUS FOR DEVICE MANAGEMENT

(71) Applicant: Zoom Video Communications, Inc., San Jose, CA (US)

(72) Inventors: Xiaolin Fu, Hefei (CN); Karen Kuei Ren Hong, San Jose, CA (US); Christopher Marinelarena, San Jose, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/175,969

(22) Filed: Feb. 15, 2021

(65) Prior Publication Data
US 2022/0247629 A1 Aug. 4, 2022

(30) Foreign Application Priority Data
Jan. 29, 2021 (CN) .......................... 202110126955.1

(51) Int. Cl.
*H04L 65/1069* (2022.01)
*H04L 41/0813* (2022.01)
*G06F 8/65* (2018.01)

(52) U.S. Cl.
CPC ............ *H04L 41/0813* (2013.01); *G06F 8/65* (2013.01); *H04L 65/1069* (2013.01)

(58) Field of Classification Search
CPC .... H04L 41/0813; H04L 65/1069; G06F 8/65
USPC ......................................................... 709/221
See application file for complete search history.

(56) References Cited

U.S. PATENT DOCUMENTS

| 7,209,160 | B2 | 4/2007 | McNelley et al. |
| 7,376,944 | B2 | 5/2008 | Crisan et al. |
| 8,122,174 | B2 | 2/2012 | Knowles et al. |
| 8,125,894 | B2 | 2/2012 | Van Den Bosch et al. |
| 8,346,229 | B2 | 1/2013 | Scott |
| 8,583,602 | B2 | 11/2013 | Welingkar et al. |
| 8,638,354 | B2 | 1/2014 | Leow et al. |

(Continued)

FOREIGN PATENT DOCUMENTS

| CA | 2651075 C | 7/2015 |
| CN | 110175042 A | 8/2019 |

(Continued)

OTHER PUBLICATIONS

International Search Report and Written Opinion mailed in corresponding PCT application No. PCT/US2022/014287, dated May 6, 2022, 71 pages.

*Primary Examiner* — Sibte H Bukhari
(74) *Attorney, Agent, or Firm* — Young Basile Hanlon & MacFarlane, P.C.

(57) ABSTRACT

A telephony device includes a memory that stores firmware to operate the telephony device. The telephony device includes a network interface that transmits a first command to establish a connection with a telephony server. The telephony device includes a receiver that receives a second command from a device manager. The second command includes an instruction to upgrade the firmware of the telephony device. The telephony device includes a processor that upgrades the firmware of the telephony device based on the second command. The processor establishes a connection to a virtual meeting room platform based on the upgraded firmware.

20 Claims, 10 Drawing Sheets

(56) References Cited

U.S. PATENT DOCUMENTS

| | | |
|---|---|---|
| 8,843,513 B1 | 9/2014 | Lew et al. |
| 8,954,866 B2 | 2/2015 | Pignataro et al. |
| 9,332,424 B2 | 5/2016 | Logan et al. |
| 9,753,746 B2 | 9/2017 | Krzyzanowski et al. |
| 9,854,063 B2 | 12/2017 | Borzycki et al. |
| 10,541,926 B2 | 1/2020 | Singh et al. |
| 11,206,372 B1* | 12/2021 | Zhang ................. H04L 12/1818 |
| 2010/0235517 A1 | 9/2010 | Augustinos et al. |
| 2010/0325622 A1 | 12/2010 | Morton |
| 2014/0068588 A1 | 3/2014 | Tan et al. |
| 2015/0350424 A1 | 12/2015 | Mazard et al. |
| 2016/0226707 A1* | 8/2016 | Schallich ............ H04L 12/2898 |
| 2018/0152509 A1 | 5/2018 | Kendall |
| 2020/0213360 A1 | 7/2020 | Ojha et al. |
| 2021/0225192 A1* | 7/2021 | Wells ..................... G09B 15/08 |

FOREIGN PATENT DOCUMENTS

| | | | |
|---|---|---|---|
| WO | 2015013647 A1 | 1/2015 | |
| WO | WO-2015013647 A1 * | 1/2015 | ......... H04L 65/1016 |

* cited by examiner

METHOD AND APPARATUS FOR DEVICE MANAGEMENT

CROSS REFERENCE TO RELATED APPLICATIONS

This application claims priority to and the benefit of Chinese Patent Application No. 202110126955.1, filed on Jan. 29, 2021, the contents of which are incorporated by reference herein in their entirety.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for device management, for example, by configuring any device such as a telephony device or a video device to operate on a virtual meeting room platform.

One aspect of this disclosure is a device management system that includes a connection edge (CE) server, a telephony device, and a device manager. The telephony device may be configured to communicate with the CE server. The telephony device and the CE server may be configured to communicate using a message queuing telemetry transport (MQTT) protocol. The device manager may be configured to build an application package for the telephony device. The application package may be used to configure the telephony device to operate on a virtual meeting room platform.

Another aspect of this disclosure is a method for use in a telephony device. The method may include establishing a connection with a telephony server. The method may include receiving a command from a device manager. The command may include an instruction to upgrade the firmware of the telephony device. The method may include upgrading the firmware of the telephony device based on the command. The method may include establishing a connection to a virtual meeting room platform.

Another aspect of this disclosure is a telephony device. The telephony device may include a memory that is configured to store firmware to operate the telephony device. The telephony device may include a transmitter that is configured to transmit a first command to establish a connection with a telephony server. The telephony device may include a receiver that is configured to receive a second command from a device manager. The second command may include an instruction to upgrade the firmware of the telephony device. The telephony device may include a processor that is configured to upgrade the firmware of the telephony device based on the second command. The processor may be configured to establish a connection to a virtual meeting room platform.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical virtualized meeting software is designed to provide a shared space for users to conduct virtual meetings. The virtualized meeting software typically is not configured for telephony features, and therefore cannot support devices such as telephones (e.g., voice-over-internet protocol (VOIP) telephones), voice conference devices, and other appliances. Accordingly, typical virtualized meeting software does not allow for management of these types of devices.

Implementations of this disclosure address problems such as these by providing a device management tool that is configured to manage these types of devices while leveraging the current architecture. The device management tool may be configured to help a user manage devices that are room/meeting centric and/or telephone/meeting centric.

Figure 1:
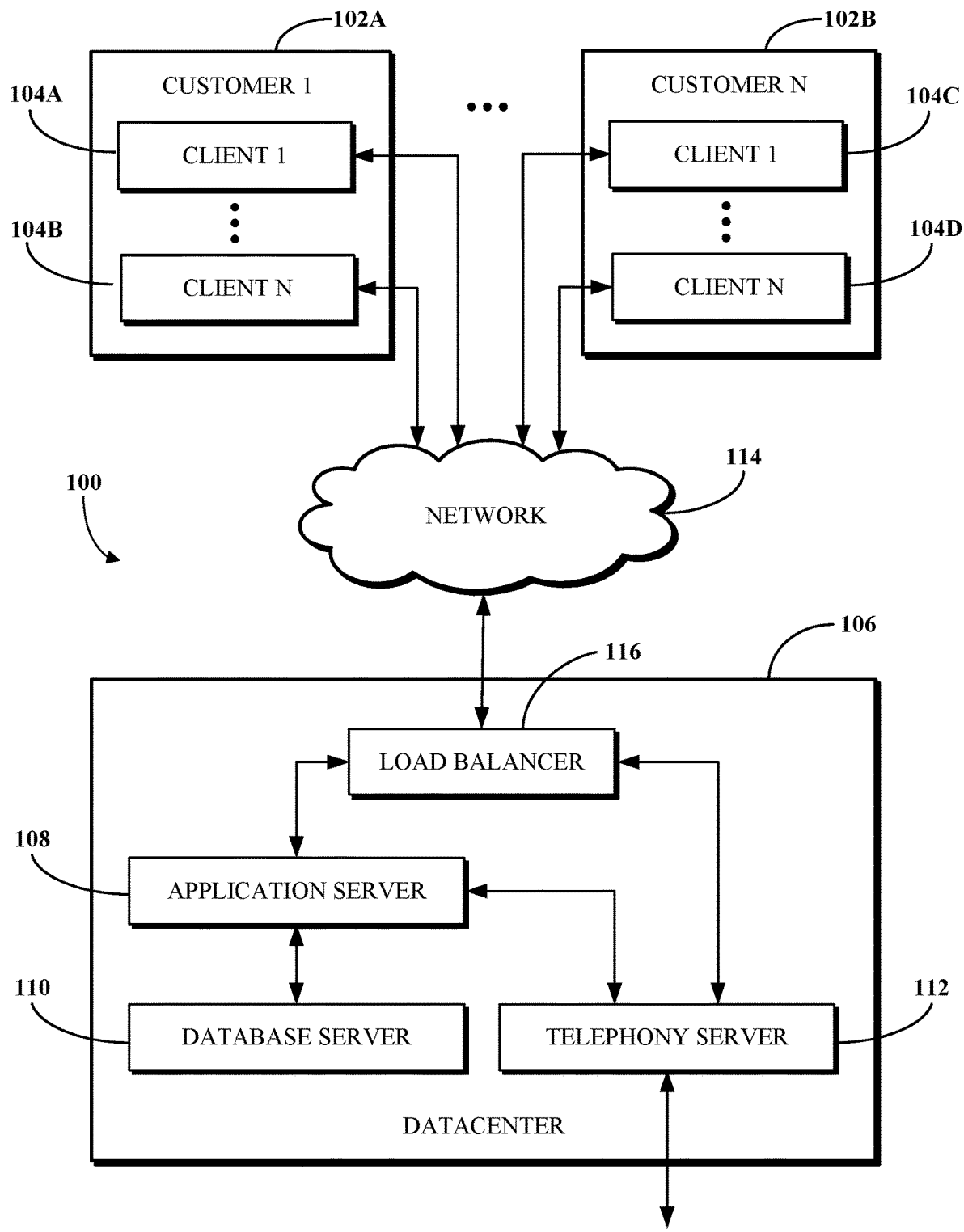
FIG. 1 is a block diagram of an example of an electronic computing and communications system.

To describe some implementations in greater detail, reference is first made to examples of hardware and software structures used to implement a method and apparatus for device management. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the PBX server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
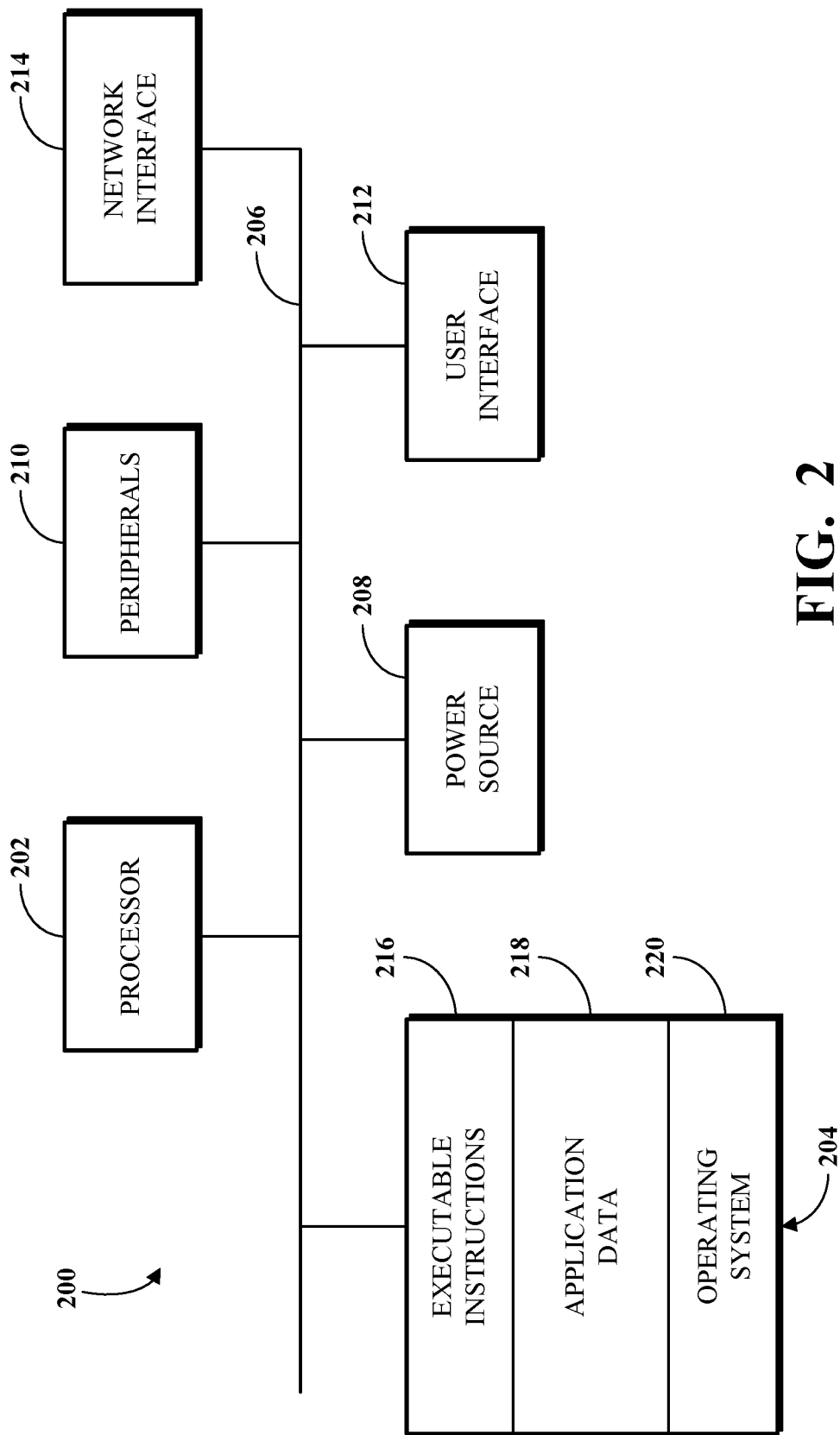
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
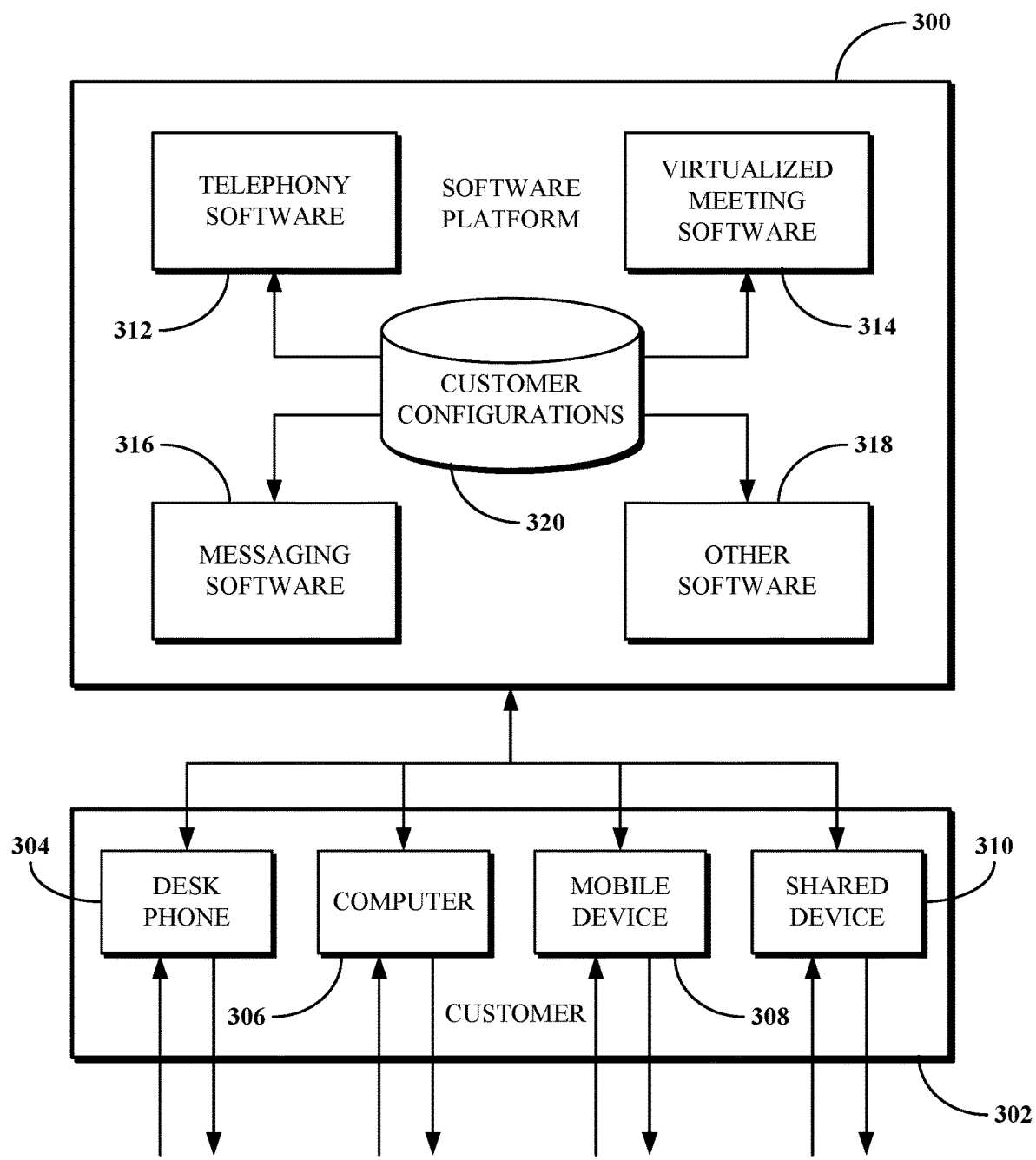
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 may be used to configure any device, such as a telephony device or a video device, to operate on a virtual meeting room platform. The examples described herein refer to a telephony device for simplicity, and it is understood that the examples apply to any device and may include video devices.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4:
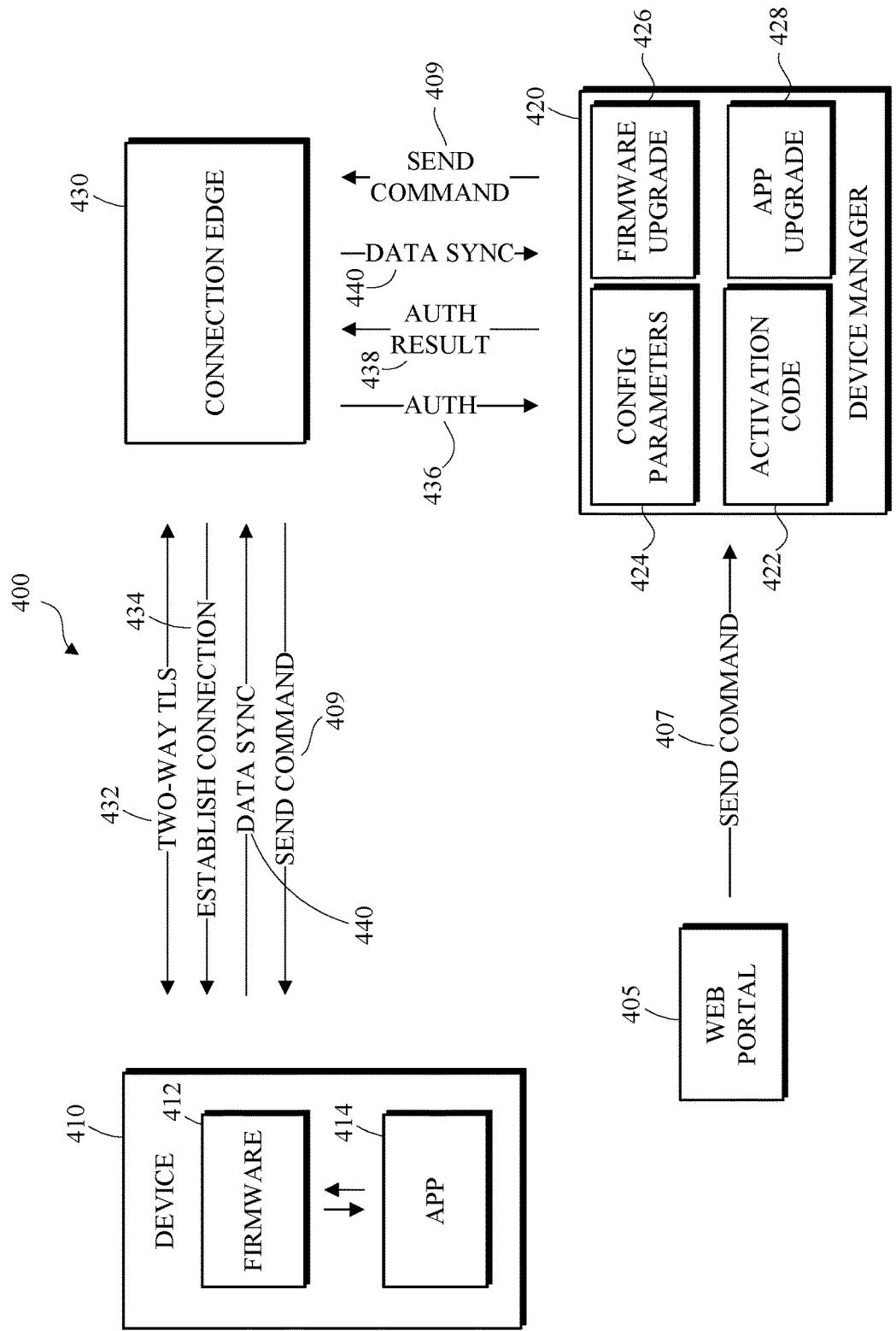
FIG. 4 is a block diagram of an example of a device management system.

FIG. 4 is a block diagram of an example of a device management system 400. The device management system 400 includes a web portal 405, a device 410, a device manager 420, and a connection edge (CE) server 430. The device management system 400 is shown with one device for simplicity and clarity, and it is understood that the device management system 400 may include multiple devices and multiple device types. The device management system 400 may use a message queuing telemetry transport (MQTT) protocol for instant bi-directional push of data between the device 410 and the CE server 430. The MQTT protocol may be based on a publish/subscribe (pub/sub) messaging architecture that reduces the total network traffic by eliminating the endless client polling. The device manager 420 may be used to upgrade an earlier firmware version on the device 410 that may not be compatible with the virtual meeting room platform.

The web portal 405 is an interface that may be accessed by a customer, for example, the customer 302 shown in FIG. 3, to perform a variety of functions. The web portal 405 may be accessed by the customer on a device, for example, a computer, a mobile device such as a smartphone or tablet, or another device that is configured to communicate via the internet. For example, the web portal 405 may be used to setup and configure the device 410 or upgrade the operating system (OS) of the device 410. The web portal 405 may be used to create a virtual meeting room or upgrade the virtual meeting room. The web portal 405 may be used to assign users to a virtual meeting room or to assign the device 410 to a user or a room (i.e., a location, such as a conference room in a building). The customer may use the web portal 405 to transmit a command 407 to the device manager 420. The command may include an HTTP request that includes a medium access control (MAC) address of the device 410.

The device 410 may include any device, for example the desk phone 304, computer 306, mobile device 308, or shared device 310 shown in FIG. 3. The device 410 may include a unique ID. The unique ID may be a device serial number, a MAC address, or any other identifiable information. The device 410 may have a unique credential, such as a certificate or private key, to connect with the device manager 420. Requests between the device 410 and the device manager 420 may be secured using transport layer security (TLS). The unique credential may be issued by the vendor of the device 410. The unique credential may be bound to the unique ID of the device 410.

As shown in FIG. 4, the device 410 includes firmware 412 and an application 414. The firmware 412 may be stored on a non-volatile memory (not shown) and include executable instructions that are used to operate the device 410. The firmware 412 may be configured to communicate with the application 414. The application 414 may be an instance of software running on the device 410. The application 414 may be stored on a memory (not shown) and executed by a processor (not shown). In an example, the application 414 may include executable instructions for creating or running a virtual meeting room, or communicating with users in a virtual meeting room.

The device manager 420 may be part of a software platform, for example, the virtualized meeting software 314 shown in FIG. 3. The device manager 420 is configured to communicate with the web portal 405 and the CE server 430. The device manager 420 may be configured to perform a variety of functions based on the command 407 received from the web portal 405. For example, the device manager 420 may be configured to generate an activation code 422 to activate the device 410. The device manager 420 may be configured to set configuration parameters 424 to configure the device 410 to operate on a virtual meeting platform. The configuration parameters 424 may be referred to as a device profile and may include a feature ID, a feature level, a configuration value, or any combination thereof. The feature ID may be an indication of the feature to be configured. The feature level may indicate a room assignment for the device 410. The configuration value may indicate whether a particular configuration parameter is enabled. The device manager 420 may configure a firmware upgrade 426 to upgrade the firmware 412 of the device 410 to operate on a virtual meeting room platform, such as the software platform 300 shown in FIG. 3. The device manager 420 may configure an application upgrade 428 to upgrade the application 414 of the device 410 to operate on a virtual meeting platform. The device manager 420 may be configured to transmit a command 409 to the device 410 via the CE server 430 to activate the device 410, configure the device 410, upgrade the firmware 412, upgrade the application 414, or any combination thereof. The command 409 may be based on the command 407 received from the web portal 405. For example, the command 409 may be an activation command if the command 407 is a request to activate a device. In another example, the command 409 may be an upgrade command if the command 407 is a request to upgrade the firmware 412 or application 412. In another example, the command 409 may be a command to set or update a configuration parameter of the device 410 if the command 407 is a request to set or update a configuration parameter. The command 409 may include a device ID field, a command type field, a data field, a sensor field, a sample interval field, a report interval field, a report data field, or any combination thereof. The sample interval field may be an instruction to sample data at and indicated interval. The report interval field may indicate the interval for reports to be sent. The report data field may indicate the type of report.

The CE server 430 may be a customer enterprise system device. When the device 410 connects to the CE server 430 with a certificate, a mutual TLS authentication 432 is performed. The CE server 430 is configured to validate the certificate with the unique ID of the device 410 to establish a TLS connection 434. The CE server 430 may transmit an authentication request 436 to the device manager 420. The device manager 420 is configured to authenticate the device 410. The device 410 may be authenticated based on the unique ID, the unique credential, or both. The device manager 420 may transmit an authentication result 438 to the CE server 430 that indicates whether the authentication succeeded or failed.

The device 410 may synchronize data with the device manager 420 by transmitting data 440 to the CE server 430. Device information such as the firmware version, device ID, or the like may be synchronized. The CE server 430 may then forward the data 440 to the device manager 420.

Figure 5:
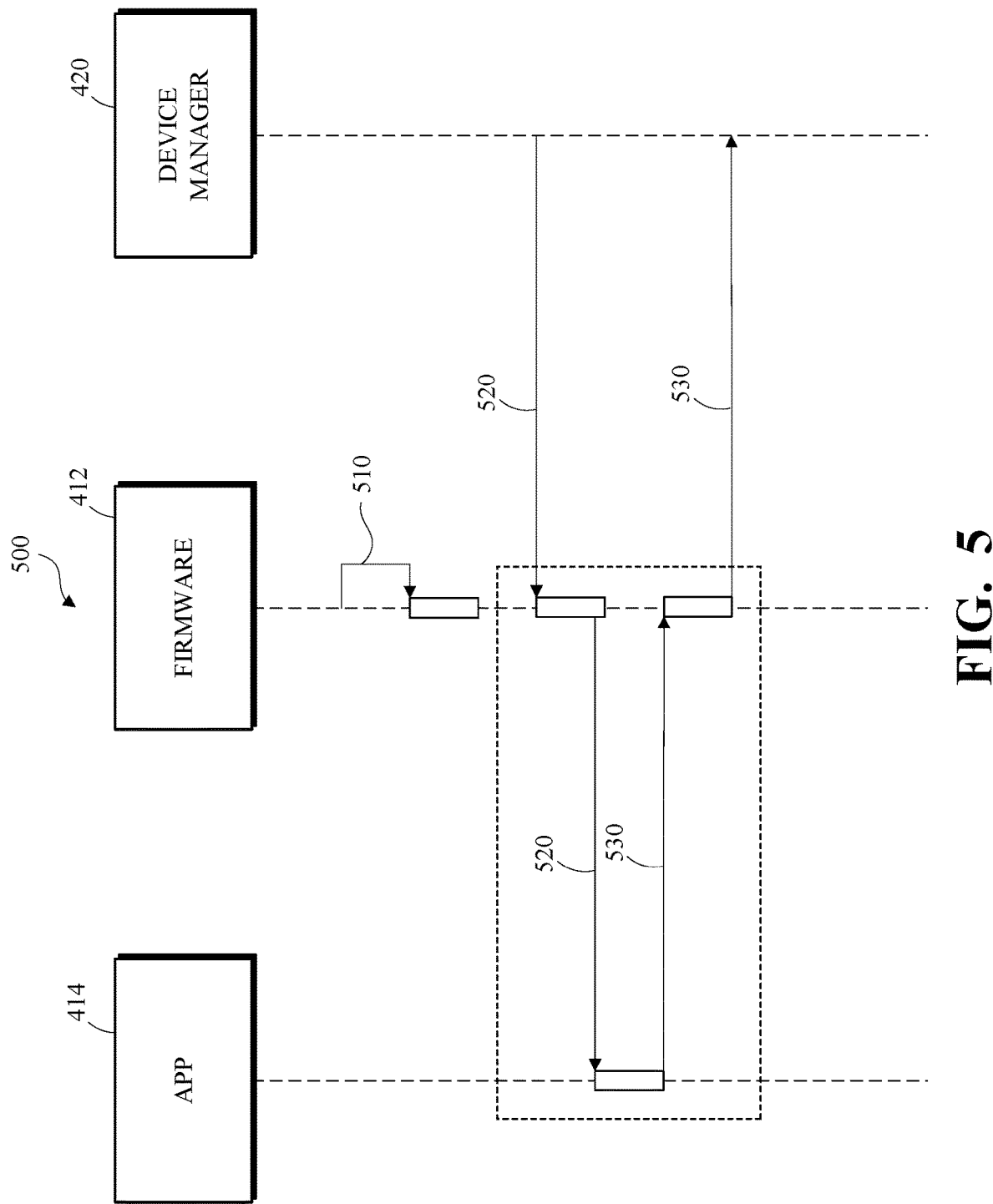
FIG. 5 is a flow diagram of an example communication between the device manager and the application shown in FIG. 4

FIG. 5 is a flow diagram of an example communication 500 between the device manager 420 and the application 414 shown in FIG. 4. As shown in FIG. 5, the device manager 420 communicates with the application 414 via the firmware 412 shown in FIG. 4. The firmware may subscribe 510 to one or more topics and listen for a message or command from the device manager 420. A topic may be a header appended to the message that includes information about the message, and may include a unique URL. For example, the header may be an MQTT message header that includes a server identification, a message type, a message destination or target, a message source, or any combination thereof. For example, a message source or server identification may indicate that the message is from the device manager 420. A message type may indicate that the message is a synchronization message. A message destination may indicate that the intended recipient of the message is the firmware 412 or the application 414.

As shown in FIG. 5, the device manager 420 publishes a command to the application 414 by transmitting a command 520 to the firmware 412. The firmware 412 receives the command 520 from the device manager 420 and transmits the command 520 to the application 414. In this example, the firmware 412 does not process the payload of the command 520. The application 414 receives the forwarded command 520 from the firmware 412 and processes the command 520. The application 414 may process the command 520 based on the message type, the message payload, or both, and may transmit a response message 530 to the firmware 412. The response message 530 may include a topic that indicates that the source of the response message 530 is the application 414. The firmware 412 publishes the response message 530 to the device manager 420.

Figure 6:
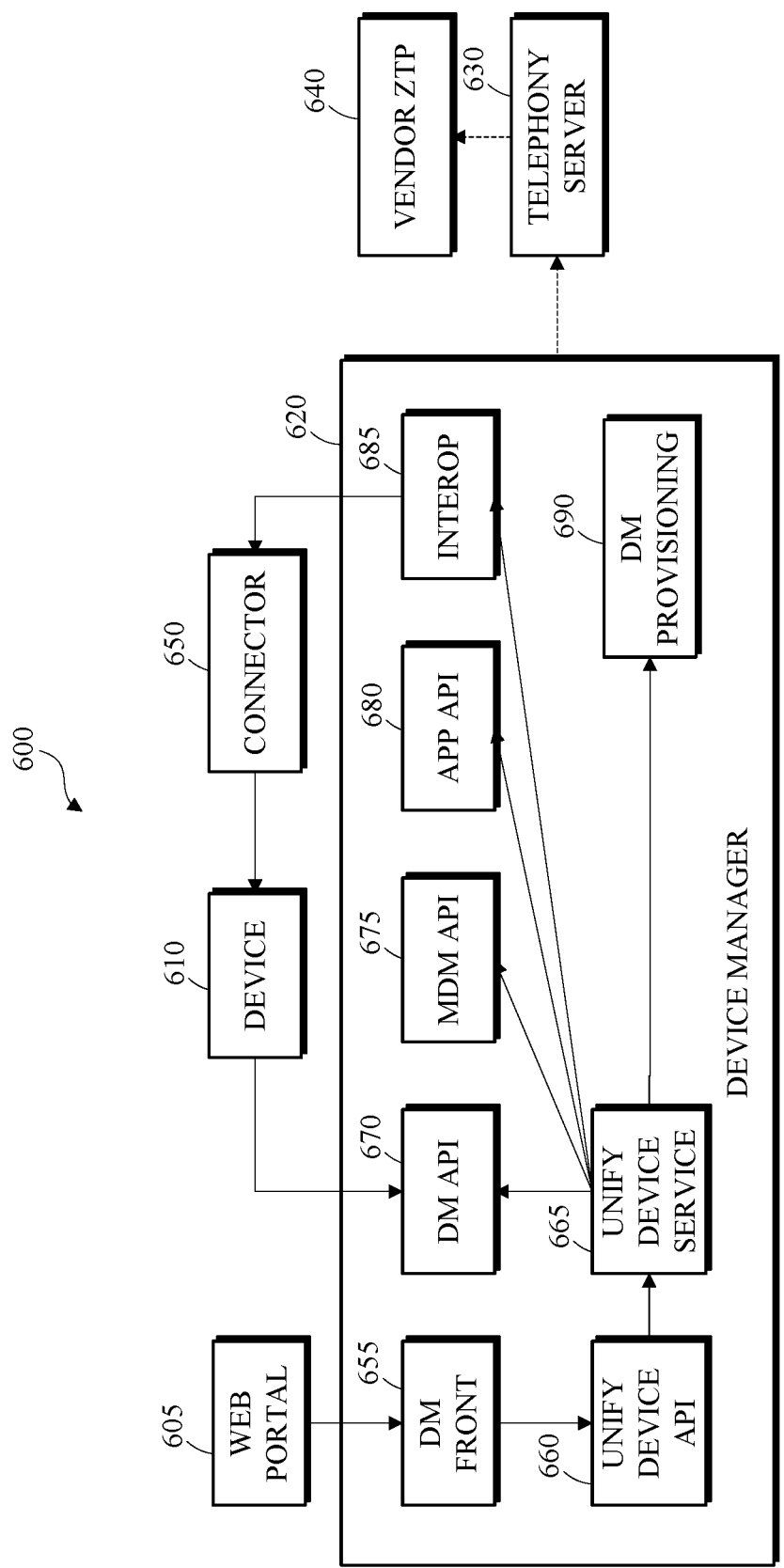
FIG. 6 is a block diagram of another example of a device management system.

FIG. 6 is a block diagram of another example of a device management system 600. The device management system 600 includes a web portal 605, a device 610, a device manager 620, an external telephony server 630, a vendor zero-touch provisioning (ZTP) tool 640, and a connector 650. The external telephony server 630 may be the telephony server 112 shown in FIG. 1. The device management system 600 is shown with one device for simplicity and clarity, and it is understood that the device management system 600 may include multiple devices and multiple device types. The device management system 600 may use an MQTT protocol for instant bi-directional push of data between the device 610 and the external telephony server 630. The MQTT protocol may be based on a publish/subscribe (pub/sub) messaging architecture that reduces the total network traffic by eliminating the endless client polling.

The web portal 605 is an interface that may be accessed by a customer, for example, the customer 302 shown in FIG. 3, to perform a variety of functions. The web portal 605 may be accessed by the customer on any device, for example, a computer, a mobile device such as a smartphone or tablet, or another device that is configured to communicate via the internet. For example, the web portal 605 may be used to setup and configure the device 610 or upgrade the OS of the device 610. The web portal 605 may be used to create a virtual meeting room or upgrade the virtual meeting room. The web portal 605 may be used to assign users to a virtual meeting room or to assign the device 610 to a user or a room (i.e., a location, such as a conference room in a building). The customer may use the web portal 605 to send a command to the device manager 620. The web portal 605 may be configured to transmit a hypertext transfer protocol (HTTP) request to the device manager 620.

The device 610 may include any device, for example the desk phone 304, computer 306, mobile device 308, or shared device 310 shown in FIG. 3. The device 610 may include a unique ID. The unique ID may be a device serial number, a MAC address, or any other identifiable information. The device 610 may have a unique credential, such as a certificate or private key, to connect with the device manager 620. Requests between the device 610 and the device manager 620 may be secured using TLS. The unique credential may be issued by the vendor of the device 610. The unique credential may be bound to the unique ID of the device 610.

The device manager 620 may be part of a software platform, for example, the software platform 300 shown in FIG. 3. The device manager 620 is configured to communicate with the web portal 605 and the external telephony server 630. The external telephony server 630 may be a management server of the device manufacturer. The device manager 620 may be configured to perform a variety of functions based on the command received from the web portal 605. For example, the device manager 620 may be configured to generate an activation code to activate the device 610. The device manager 620 may be configured to set configuration parameters to configure the device 610. The device manager 620 may configure a firmware upgrade to upgrade the firmware of the device 610. The device manager 620 may configure an application upgrade to upgrade the application of the device 610. The device manager 620 may be configured to transmit a command to the device 610 via the connector 650 to activate the device 610, configure the device 610, upgrade the firmware, upgrade the application, or any combination thereof. The command may be based on the command received from the web portal 605.

As shown in FIG. 6, the device manager 620 includes a device manager front end 655, a unify device API 660, a unify device service 665. The device manager 620 includes one or more subsystem components, such as a device manager API 670, a manufacturer device management (MDM) API 675, an application API 680, an interoperability provisioning tool 685, and a device management provisioning tool 690. The device manager front end 655 is configured to receive the HTTP request from the web portal 605 and forward the HTTP request to the unify device API 660. The HTTP request may include some metadata, for example, a device MAC address in an extensible field header that indicates the type of device that can be processed by the unify device API 660.

The unify device API 660 may be configured to support multiple device types and multiple protocols for different devices to provide a uniform customer experience. The unify device API 660 may query a mapping table to obtain corresponding subsystem information to generate a unified context to map the various protocols and devices. The unify device API 660 generates a command based on the HTTP request and transmits the command to the unify device service 665. In an example, the unify device API 660 may process the metadata in the HTTP request to identify the device type and include the device type in the command to the unify device service 665. The unify device service 665 is configured to transmit the command to one or more of the device manager API 670, MDM API 675, application API 680, interoperability provisioning tool 685, and device management provisioning tool 690 based on a device type indicated in the command.

In some examples, the device manager API 670 may be installed on the device 610. The device manager API may be configured to communicate with the device 610 using an MQTT protocol. The unify device service 665 may transmit the command to the device manager API 670 when the device type indicates that the device 610 is a registered device (e.g., registered with the software platform). The unify device service 665 may transmit the command to the MDM API 675 when the device type indicates that the device 610 is configured with a particular manufacturer OS, for example an Apple OS or a Windows OS. The unify device service 665 may transmit the command to the application API 680 when the device type indicates that the device 610 is an unregistered device. The unify device service 665 may transmit the command to the interoperability provisioning tool 685 when the device type indicates that the device 610 is an existing device that has been provisioned and is supported. For some existing devices, a factory reset may be performed to trigger a connection with a management server of the device manufacturer. The unify device service 665 may transmit the command to the device management provisioning tool 690 when the device type indicates that the device 610 is an older device. The device management provisioning tool 690 may be used to provide backwards compatibility for older devices. The device management provisioning tool 690 may be used by the device 610 to communicate with a management server of the device manufacturer.

The device manager 620 is configured to build an application package for an device that has telephony features, such as device 610, to configure the device to operate on a virtual meeting room platform. The device manager 620 is configured to obtain configuration information for the device 610 from the vendor ZTP tool 640 via the external telephony server 630. The device manager 620 is configured to update the configuration information to redirect communication between the device 610 and the external telephony server 630 such that the device 610 is configured to communicate with the device manager 620. The interoperability provisioning tool 685 is configured to update the configuration parameters (i.e., device profile) of the device 610 via the connector 650. When the configuration of the device 610 is updated, the device 610 is then configured to communicate with the device manager 620 on the virtual meeting platform.

Figure 7:
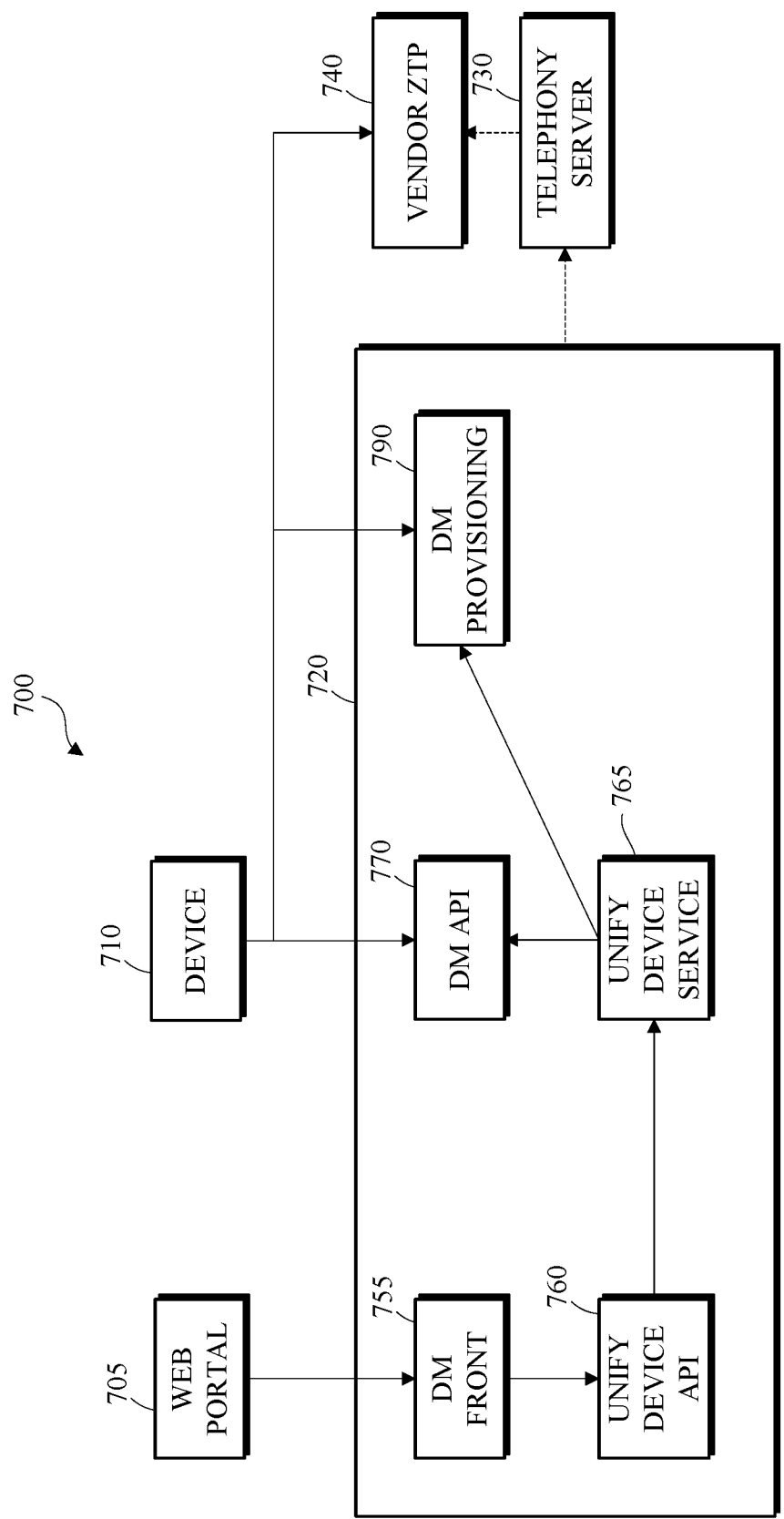
FIG. 7 is a block diagram of another example of a device management system.

FIG. 7 is a block diagram of another example of a device management system 700. In this example, the device management system 700 may be configured to migrate an existing telephony device or video device to a virtual meeting room platform. The device management system 700 includes a web portal 705, a device 710, a device manager 720, an external telephony server 730, and a vendor ZTP tool 740. The device management system 700 is shown with one device for simplicity and clarity, and it is understood that the device management system 700 may include multiple devices and multiple device types. The device management system 700 may use an MQTT protocol for instant bi-directional push of data between the device 710 and the external telephony server 730. The MQTT protocol may be based on a publish/subscribe (pub/sub) messaging architecture that reduces the total network traffic by eliminating endless client polling.

The web portal 705 is an interface that may be accessed by a customer, for example, the customer 302 shown in FIG. 3, to perform a variety of functions. The web portal 705 may be accessed by the customer on any device, for example, a computer, a mobile device such as a smartphone or tablet, or another device that is configured to communicate via the internet. For example, the web portal 705 may be used to setup and configure the device 710 or upgrade the OS of the device 710. The web portal 705 may be used to create a virtual meeting room or upgrade the virtual meeting room. The web portal 705 may be used to assign users to a virtual meeting room or to assign the device 710 to a user or a room (i.e., a location, such as a conference room in a building).

The customer may use the web portal 705 to send a command to the device manager 720. The web portal 705 may be configured to transmit an HTTP request to the device manager 720.

The device 710 may include any device, for example the desk phone 304, computer 306, mobile device 308, or shared device 310 shown in FIG. 3. The device 710 may include a unique ID. The unique ID may be a device serial number, a MAC address, or any other identifiable information. The device 710 may have a unique credential, such as a certificate or private key, to connect with the device manager 720. Requests between the device 710 and the device manager 720 may be secured using TLS. The unique credential may be issued by the vendor of the device 710. The unique credential may be bound to the unique ID of the device 710.

The device manager 720 may be part of a software platform, for example, the software platform 300 shown in FIG. 3. The device manager 720 is configured to communicate with the web portal 705 and the external telephony server 730. The device manager 720 may be configured to perform a variety of functions based on the command received from the web portal 705. For example, the device manager 720 may be configured to generate an activation code to activate the device 710. The device manager 720 may be configured to set configuration parameters to configure the device 710. The device manager 720 may configure a firmware upgrade to upgrade the firmware of the device 710. The device manager 720 may configure an application upgrade to upgrade the application of the device 710. The device manager 720 may be configured to transmit a command to the device 710 via the connector 750 to activate the device 710, configure the device 710, upgrade the firmware, upgrade the application, or any combination thereof. The command may be based on the command received from the web portal 705.

As shown in FIG. 7, the device manager 720 includes a device manager front end 755, a unify device API 760, a unify device service 765, a device manager API 770, and a device management provisioning tool 790. The device manager front end 755 is configured to receive the HTTP request from the web portal 705 and forward the HTTP request to the unify device API 760. The HTTP request may include a MAC address of the device 710.

The unify device API 760 may be configured to support multiple device types and multiple protocols for different devices. The unify device API 760 generates a command based on the HTTP request and transmits the command to the unify device service 765. The unify device service 765 is configured to transmit the command to the device manager API 770, the device management provisioning tool 790, or both, based on a device type indicated in the command.

In some examples, the device manager API 770 may be installed on the device 710. The device manager API may be configured to communicate with the device 710 using an MQTT protocol. The unify device service 765 may transmit the command to the device manager API 770 when the device type indicates that the device 710 is a registered device. The unify device service 765 may transmit the command to the device management provisioning tool 790 when the device type indicates that the device 710 is an older device. The device management provisioning tool 790 may be used to provide backwards compatibility for older devices. The device management provisioning tool 790 may be used by the device 710 to communicate with a management server of the device manufacturer.

The device manager 720 is configured to build an application package for any device that has telephony features or video features, such as device 710, to configure the device to operate on a virtual meeting room platform. The device manager 720 is configured to push the MAC address and configuration information (i.e., device profile) for the device 710 to the external telephony server 730 to connect the vendor ZTP tool with 740 with the device management provisioning tool 790. The device manager 720 is configured to connect the device management API 770 to the device 710 to allow the device to perform automatic sign-in. The device management API 770 is configured to push an upgrade command to the device 710 to upgrade the firmware, application, or both. The device management provisioning tool 790 is configured to transmit a provisioning profile that includes a new firmware version to the device 710. The device 710 is configured to upgrade to the new firmware version. After installation of the new firmware, the device 710 restarts and establishes a connection to the device management API 770.

Figure 8:
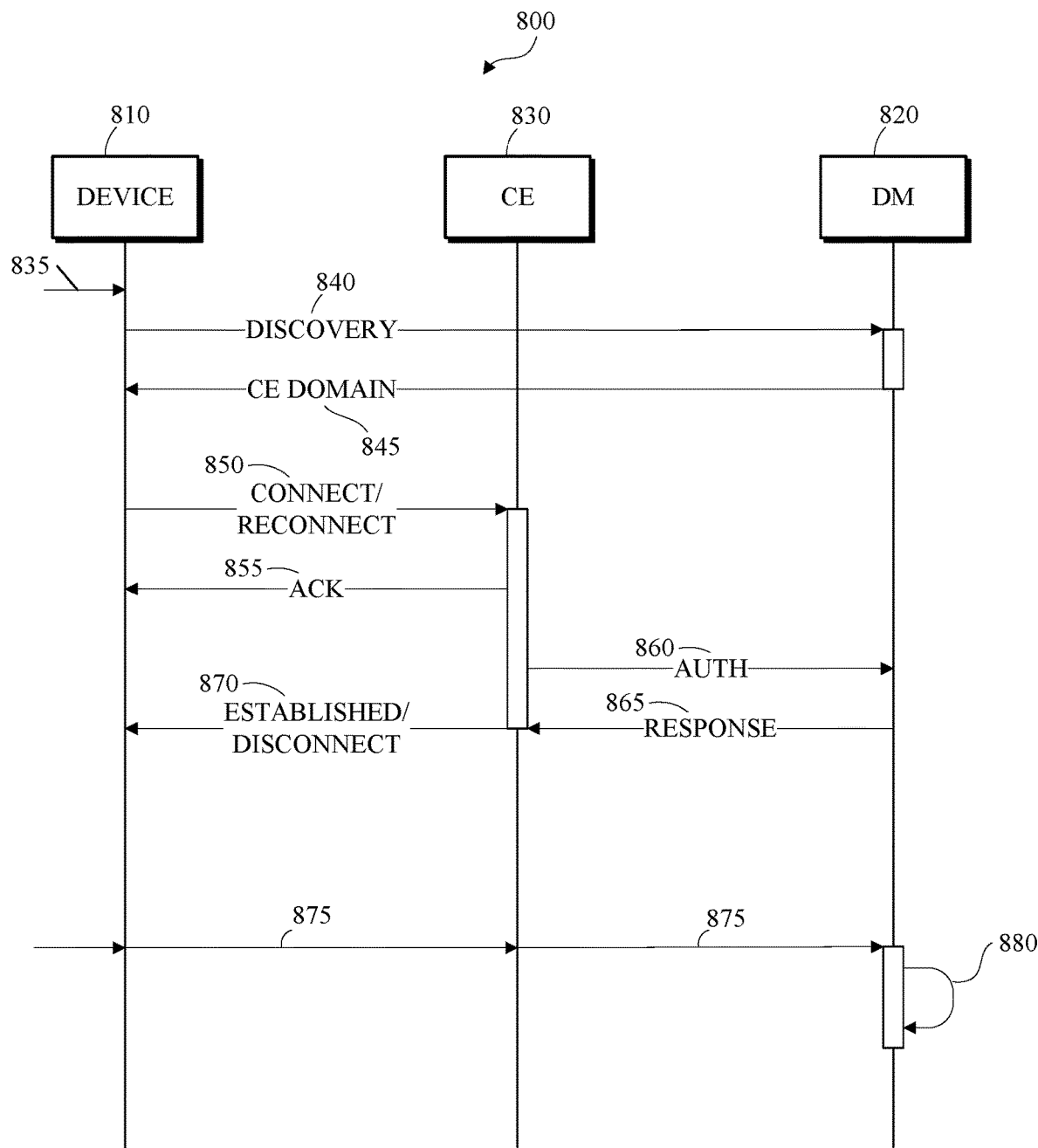
FIG. 8 is a flow diagram of an example of an enrollment procedure for a device.

FIG. 8 is a flow diagram of an example of an enrollment procedure 800 for a device 810. The enrollment procedure 800 may be performed using at least one device 810, a device manager 820, and a CE server 830. The device 810 may be the device 410 shown in FIG. 4, the device 610 shown in FIG. 6, or device 710 shown in FIG. 7. The device manager 820 may be the device manager 420 shown in FIG. 4, the device manager 620 shown in FIG. 6, or the device manager 720 shown in FIG. 7. The CE server 830 may be the CE server 430 shown in FIG. 4. The enrollment procedure 800 is activated during initialization to validate eligibility of the device 810 and to notify the CE server 830 that a new device has been registered.

The device 810 may include a unique ID. The unique ID may be a device serial number, a MAC address, or any other identifiable information. The device 810 may have a unique credential, such as a certificate or private key, to connect with the device manager 820. Requests between the device 810 and the device manager 820 may be secured using TLS. The unique credential may be issued by the vendor of the device 810. The unique credential may be bound to the unique ID of the device 810.

The device manager 820 may be part of a software platform, for example, the software platform 300 shown in FIG. 3. The device manager 820 is configured to communicate with the device 810 and the CE server 830. The CE server 830 may be a customer enterprise system device. When the device 810 initiates a boot up 835 and connects to the CE server 830 with a certificate, a mutual TLS authentication is performed. Upon boot up 835, the device transmits a discovery message 840 to the device manager 820 to obtain a CE server domain. The device manager 820 is configured to receive the discovery message 840 from the device 810 and transmit a response message 845 that indicates the CE server domain.

The device 810 is configured to transmit a message 850 to the CE server 830. The message 850 may include information about the device 810, for example, a device identification (ID), device firmware version, device hardware version, device certificate, device MAC address, device serial number, device IP address, device manufacturer, device product model, or any combination thereof. The message 850 may include a message type that indicates whether the device 810 is to connect or reconnect to the CE server 830. The message may indicate to reconnect when the device 810 had previously connected to the CE server 830, or that the connection between the device 810 and the CE server 830 was interrupted. The CE server 830 may transmit an acknowledgment (ACK) 855 to the device 810 that indicates that the CE server 830 has received the message 850.

The CE server 830 is configured to validate the device certificate with the device ID of the device 810, and transmits an authorization request 860 to the device manager 820 to establish a TLS connection. The device manager 820 is configured to authenticate the device 810 and transmit an authorization response 865 to the CE server 830. The CE server 830 may transmit a message 870 to the device 810 to establish a connection or disconnect based on the authorization response 865. For example, if the authorization is successful, the message 870 may indicate to establish a connection. If the authorization failed, the message may indicate that the authorization failed.

When the connection between the device 810 and the CE server 830 is established, the device 810 may transmit a polling message 875 to the CE server 830. The polling message 875 may include a payload that includes information regarding the device 810. For example, the polling message 875 may include a device ID, device firmware version, device hardware version, device MAC address, device serial number, device IP address, device manufacturer, device product model, device status, or any combination thereof. The CE server 830 is configured to receive the polling message 875 from the device 810 and forward the polling message 875 to the device manager 820. The device manager 820 is configured to receive the polling message 875 from the CE server 830. The device manager is configured to process the payload of the polling message 875 and enroll 880 the device 810 with a software platform such as the software platform 300 shown in FIG. 3. In some examples, the device 810 may transmit the polling message 875 directly to the device manager 820.

Figure 9:
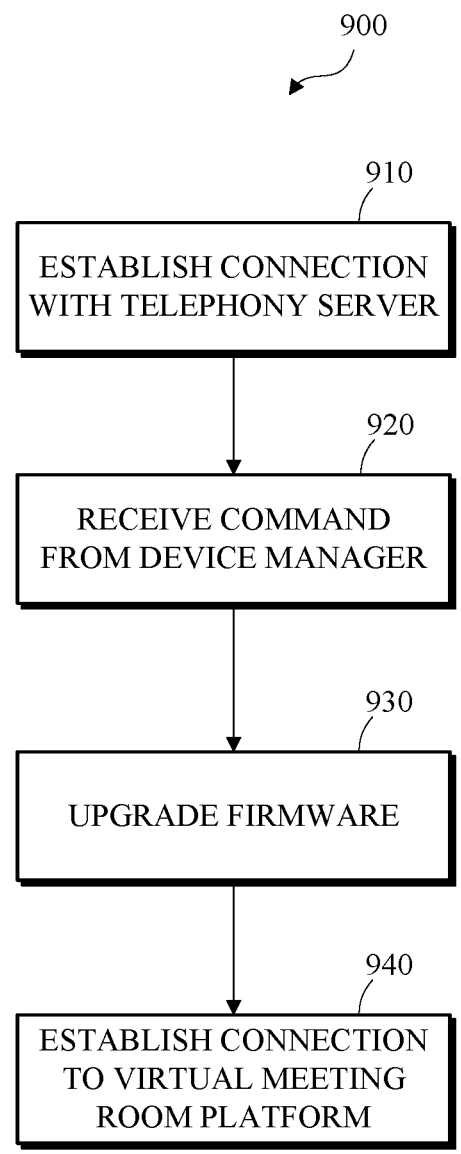
FIG. 9 is a flow diagram of an example of a method for use in a telephony device to connect to a virtual meeting room platform.

FIG. 9 is a flow diagram of an example of a method 900 for use in a telephony device or a video device to connect to a virtual meeting room platform. This example refers to a telephony device for simplicity, and it is understood that it may apply to any device, for example the device 410 shown in FIG. 4, device 610 shown in FIG. 6, device 710 shown in FIG. 7, or device 810 shown in FIG. 8. The telephony device may include a network interface that is configured to transmit and receive messages. In some examples, the telephony device may include a transmitter and a receiver.

As shown in FIG. 9, the method 900 includes establishing 910 a connection with a telephony server. A network interface or transmitter of the telephony device may be configured to transmit a command to establish the connection with the telephony server. The telephony server may be a management server of the device manufacturer.

The method 900 includes receiving 920 a command from a device manager. The network interface may be configured to receive the command from the device manager. In some examples, the telephony device may include a receiver that is configured to receive the command from the device manager. The device manager may be part of the software platform 300 shown in FIG. 3 and configured to operate a virtual meeting room. The command may include an instruction to upgrade the firmware of the telephony device. The command may include a device ID, a device firmware version, a device hardware version, a device MAC address, a device serial number, a device IP address, a device manufacturer, a device product model, a device status, or any combination thereof.

The method 900 includes upgrading 930 the firmware of the telephony device. The firmware may be upgraded based on the command. The firmware of the telephony device may be stored on a non-volatile memory of the telephony device. The telephony device may include a processor that is configured to upgrade the firmware.

The method 900 includes establishing 940 a connection to a virtual meeting room platform. The connection to the virtual meeting room platform may be performed by the processor of the telephony device using an application package generated by a device manager, such as device manager 620 shown in FIG. 6 or device manager 720 shown in FIG. 7. The method 900 may include disconnecting from the telephony server in response to establishing the connection to the virtual meeting room platform.

In some examples, the method 900 may include transmitting a message to a CE server. The message may include a certificate and a device ID of the telephony device. The certificate and the device ID may be used in an authentication process to connect to the CE server. In some examples, the method 900 may include transmitting a polling message to the CE server. The polling message may be transmitted to the CE server to enroll the telephony device on the virtual meeting room platform. The polling message may include a device ID, a device firmware version, a device hardware version, a device MAC address, a device serial number, a device IP address, a device manufacturer, a device product model, a device status, or any combination thereof.

The method 900 can be executed using computing devices, such as the systems, hardware, and software described with respect to FIGS. 1-8. The method 900 can be performed, for example, by executing a machine-readable program or other computer-executable instructions, such as routines, instructions, programs, or other code. The steps, or operations, of the method 900 or another technique, method, process, or algorithm described in connection with the implementations disclosed herein can be implemented directly in hardware, firmware, software executed by hardware, circuitry, or a combination thereof.

For simplicity of explanation, the method 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 10:
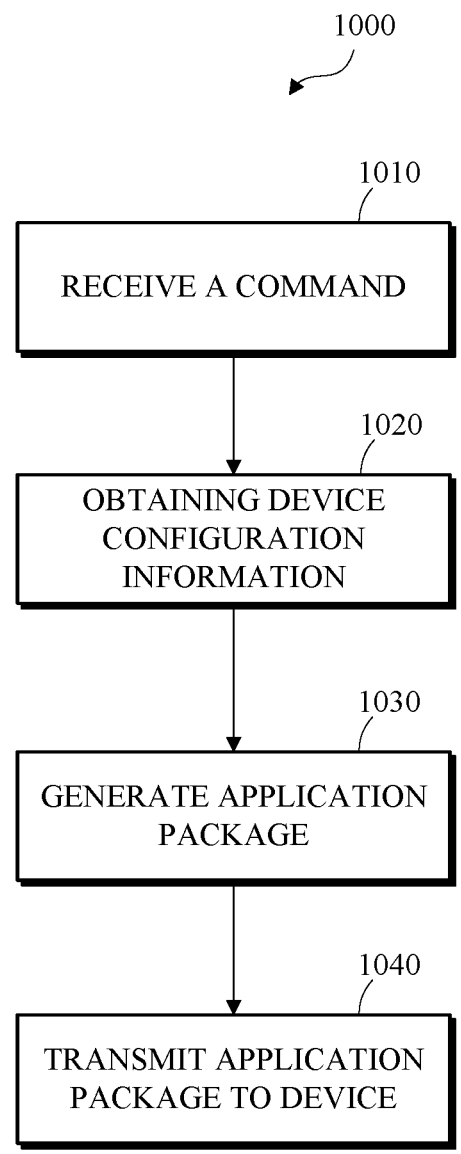
FIG. 10 is a flow diagram of an example of a method for use in a device manager to configure a telephony device to operate on a virtual meeting room platform.

FIG. 10 is a flow diagram of an example of a method 1000 for use in a device manager to configure a telephony device or a video device to operate on a virtual meeting room platform. The device manager may be the device manager 420 shown in FIG. 4, the device manager 620 shown in FIG. 6, or the device manager 720 shown in FIG. 7. This example refers to a telephony device for simplicity, and it is understood that this example may apply to any device, for example the device 410 shown in FIG. 4, device 610 shown in FIG. 6, device 710 shown in FIG. 7, or device 810 shown in FIG. 8.

As shown in FIG. 10, the method 1000 includes receiving 1010 a command, for example command 407 shown in FIG. 4. The command may be received from a customer via a web portal. The command may include an HTTP request that includes some metadata, for example, a device MAC address in an extensible field header that indicates the type of device that can be processed by the device manager. In an example, the command may include an instruction to upgrade the firmware of the telephony device to operate on a virtual meeting room platform. The command may include a device ID, a device firmware version, a device hardware version, a device MAC address, a device serial number, a device IP address, a device manufacturer, a device product model, a device status, or any combination thereof.

The method 1000 includes obtaining 1020 a device configuration, for example, from an external telephony server such as external telephony server 630 shown in FIG. 6 or external telephony server 730 shown in FIG. 7. The external telephony server may be a management server of the device manufacturer. The device configuration may include a device ID, a device firmware version, a device hardware version, a device MAC address, a device serial number, a device IP address, a device manufacturer, a device product model, or any combination thereof.

The method 1000 includes generating 1030 an application package. The application package may be generated based on the command, the device configuration obtained from the external telephony server, or both.

The method 1000 includes transmitting 940 the application package to the telephony device to upgrade the firmware of the telephony device to operate on the virtual meeting room platform.

The method 1000 can be executed using computing devices, such as the systems, hardware, and software described with respect to FIGS. 1-8. The method 1000 can be performed, for example, by executing a machine-readable program or other computer-executable instructions, such as routines, instructions, programs, or other code. The steps, or operations, of the method 1000 or another technique, method, process, or algorithm described in connection with the implementations disclosed herein can be implemented directly in hardware, firmware, software executed by hardware, circuitry, or a combination thereof.

For simplicity of explanation, the method 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device management system comprising:
a connection edge (CE) server configured to communicate with a telephony device using a message queueing telemetry transport (MQTT) protocol; and
a device manager comprising a processor and a memory, the device manager configured to:
obtain a device configuration from an external telephony server of a manufacturer of the telephony device;
prior to enrollment of the telephony device on a virtual meeting room platform, build an application package for the telephony device based on the device configuration to configure the telephony device to operate on the virtual meeting room platform; and
transmit the application package to the telephony device via the CE server to connect the telephony device to the CE server and perform a mutual transport layer security (TLS) authentication.

2. The device management system of claim 1, wherein the telephony device comprises firmware that is configured to communicate with the CE server.

3. The device management system of claim 1, wherein the telephony device comprises firmware that is configured to communicate with the CE server and the device manager is configured to receive an instruction to upgrade the firmware of the telephony device.

4. The device management system of claim 1, wherein the telephony device comprises firmware that is configured to communicate with the CE server and the device manager is configured to:
   receive an instruction to upgrade the firmware of the telephony device; and
   transmit the instruction to the CE server.

5. The device management system of claim 1, wherein the telephony device comprises firmware that is configured to communicate with the CE server and the device manager is configured to:
   receive an instruction to upgrade the firmware of the telephony device; and
   transmit the instruction to the telephony device via the CE server to upgrade the firmware of the telephony device.

6. The device management system of claim 1, wherein the telephony device comprises firmware that is configured to communicate with the CE server and the device manager is configured to:
   receive an instruction to upgrade the firmware of the telephony device; and
   transmit the instruction to the telephony device via the CE server to upgrade the firmware of the telephony device to enable the telephony device to connect to the virtual meeting room platform using the upgraded firmware.

7. The device management system of claim 1, wherein the CE server is a customer enterprise system device.

8. A method comprising:
   obtaining, by a device manager, a device configuration from an external telephony server of a manufacturer of a telephony device;
   building, by the device manager prior to enrollment of the telephony device on a virtual meeting room platform, an application package for the telephony device based on the device configuration to configure the telephony device to operate on the virtual meeting room platform; and
   transmitting, by the device manager, the application package to the telephony device via a connection edge (CE) server to connect the telephony device to the CE server and perform a mutual transport layer security (TLS) authentication.

9. The method of claim 8, wherein the telephony device comprises firmware that is configured to communicate with the CE server.

10. The method of claim 8, wherein the telephony device comprises firmware that is configured to communicate with the CE server, the method further comprising:
    receiving, by the device manager, an instruction to upgrade the firmware of the telephony device.

11. The method of claim 8, wherein the telephony device comprises firmware that is configured to communicate with the CE server, the method further comprising:
    receiving, by the device manager, an instruction to upgrade the firmware of the telephony device; and
    transmitting, by the device manager, the instruction to the CE server.

12. The method of claim 8, wherein the telephony device comprises firmware that is configured to communicate with the CE server, the method further comprising:
    receiving, by the device manager, an instruction to upgrade the firmware of the telephony device; and
    transmitting, by the device manager, the instruction to the telephony device via the CE server to upgrade the firmware of the telephony device.

13. The method of claim 8, wherein the telephony device comprises firmware that is configured to communicate with the CE server, the method further comprising:
    receiving, by the device manager, an instruction to upgrade the firmware of the telephony device; and
    transmitting, by the device manager, the instruction to the telephony device via the CE server to upgrade the firmware of the telephony device to enable the telephony device to connect to the virtual meeting room platform using the upgraded software.

14. A device manager comprising:
    a memory; and
    a processor configured to:
      obtain a device configuration from an external telephony server of a manufacturer of a telephony device;
      prior to enrollment of the telephony device on a virtual meeting room platform, build an application package for the telephony device based on the device configuration to configure the telephony device to operate on the virtual meeting room platform; and
      transmit the application package to the telephony device via a connection edge (CE) server to connect the telephony device to the CE server and perform a mutual transport layer security (TLS) authentication.

15. The device manager of claim 14, wherein the telephony device comprises firmware that is configured to communicate with the CE server.

16. The device manager of claim 14, wherein the telephony device comprises firmware that is configured to communicate with the CE server and the device manager is configured to receive an instruction to upgrade the firmware of the telephony device.

17. The device manager of claim 14, wherein the telephony device comprises firmware that is configured to communicate with the CE server and the device manager is configured to:
    receive an instruction to upgrade the firmware of the telephony device; and
    transmit the instruction to the CE server.

18. The device manager of claim 14, wherein the telephony device comprises firmware that is configured to communicate with the CE server and the device manager is configured to:
    receive an instruction to upgrade the firmware of the telephony device; and
    transmit the instruction to the telephony device via the CE server to upgrade the firmware of the telephony device.

19. The device manager of claim 14, wherein the telephony device comprises firmware that is configured to communicate with the CE server and the device manager is configured to:
    receive an instruction to upgrade the firmware of the telephony device; and
    transmit the instruction to the telephony device via the CE server to upgrade the firmware of the telephony device to enable the telephony device to connect to the virtual meeting room platform using the upgraded firmware.

20. The device manager of claim 14, wherein the CE server is a customer enterprise system device.

* * * * *